(12) United States Patent
Hums et al.

(10) Patent No.: US 6,287,524 B1
(45) Date of Patent: Sep. 11, 2001

(54) PLATE-TYPE CATALYTIC CONVERTER

(75) Inventors: Erich Hums, Hessdorf; Andreas Klatt, Nürnberg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/291,664

(22) Filed: Apr. 14, 1999

(30) Foreign Application Priority Data

Apr. 14, 1998 (DE) ............................................. 198 16 482

(51) Int. Cl.[7] ........................... B01D 53/34; B01D 53/88; B01D 53/94; F01N 3/28
(52) U.S. Cl. ......................... 422/180; 422/177; 422/222
(58) Field of Search ................................. 422/177, 180, 422/222; 502/439

(56) References Cited

U.S. PATENT DOCUMENTS 5,374,402 * 12/1994 Hitachi et al. ........................ 422/177
5,833,932 * 11/1998 Schmelz ................................ 422/180

FOREIGN PATENT DOCUMENTS

3714262A1  11/1988 (DE).
4313187A1   1/1994 (DE).

OTHER PUBLICATIONS

Published International Application No. 94/26411 (Hüttenhofer et al.), dated Nov. 24, 1994.

* cited by examiner

Primary Examiner—Hien Tran
(74) Attorney, Agent, or Firm—Herbert L. Lerner; Laurence A. Greenberg; Werner H. Stemer

(57) ABSTRACT

A plate-type catalytic converter includes a stack of first plates and second plates. In operation, a flow medium flows from an inflow side to an outflow side. Leading edges of the second plates are set back in the direction of the outflow side relative to leading edges of the first plates. Catalytic activity can therefore be significantly improved as compared with a plate-type catalytic converter of conventional construction for the same physical volume, since the contribution toward the catalytic activity of the catalyst which is provided by turbulent flow is increased without increasing pressure loss or an additional risk of blockage by ash.

10 Claims, 2 Drawing Sheets

PLATE-TYPE CATALYTIC CONVERTER

BACKGROUND OF THE INVENTION

FIELD OF THE INVENTION

The invention relates to a plate-type catalytic converter through which a flow medium flows from an inflow side to an outflow side and which includes a stack of first plates and second plates each having a catalytically active surface.

Such a plate-type catalytic converter is used, inter alia, for reducing the content of nitrogen oxides in the flue gas or waste gas of a combustion plant. The selective catalytic reduction (SCR) process is used in that case to convert nitrogen oxides together with a reducing agent introduced into the gas mixture in advance, generally ammonia $NH_3$, into water and molecular nitrogen on a catalytically active surface. Instead of ammonia, the use of urea, which is decomposed into ammonia in the flue gas, is also known. For that purpose, the catalytically active material, with which the plates are coated on both sides, is generally formed of titanium dioxide $TiO_2$ and one or more of the additives tungsten trioxide $WO_3$, molybdenum trioxide $MoO_3$ and vanadium pentoxide $V_2O_5$.

A plate-type catalytic converter is composed of a stack of plates provided with a catalytically active surface and a holding device for the plates. The holding device which is used is generally an element casing in which the plates are evenly spaced and oriented parallel to one another. The element casing usually has a cuboid shape which is open at the ends, allowing a flow medium, for example a flue gas, to flow through the cuboid from the inflow side to the outflow side parallel to the long sides. The plate planes are aligned parallel to the flow direction. A plate-type catalytic converter of that type is disclosed in International Application No. WO 94/26411 A1, corresponding to U.S. Pat. No. 5,820,832.

A plurality of those element casings fitted with catalytically active plates are disposed alongside one another to form a catalyst module. A complete flue-gas cleaning unit in turn includes a number of banks of such catalyst modules disposed one after the other in a flue-gas duct. For example, a DeNOx unit for reducing the content of nitrogen oxides in the flue gas from a fossil fuel-fired power station usually has three to five banks of such catalyst modules.

In order to space the individual plates in an element casing, each plate is usually provided with a bead-like structure running continuously along the plate. In that way, a plurality of separate sub-chambers through which a flow medium flows from the inflow side to the outflow side are created between two directly adjacent plates. There is essentially a laminar flow of the flow medium through those sub-chambers, producing a disadvantageous flow profile for the catalytic conversion of the reactants, for example the nitrogen oxides and the ammonia. The flow medium flowing in the center of a sub-chamber only reaches the catalytically active surface of the sub-chamber through the mechanism of diffusion and not through turbulence. That generally hinders the contact of the reactants with the catalytically active surface of the sub-chambers which is necessary for the catalytic reaction.

International Application No. WO 94/26411 A1, corresponding to U.S. Pat. No. 5,820,832, describes a plate-type catalytic converter which is fitted with first plates, that have virtually linear elevations, beads or similar structures, and in addition is fitted with second plates. The structures of the first plates are aligned virtually parallel to the flow direction, while the structures of the second plates are transverse or inclined to the flow direction. In that way, turbulence can be generated within the sub-chambers between the individual plates. However, that type of catalytic converter has a disadvantage which is that the structures of the second plates cause a high pressure loss in the flow of the flow medium, and that soot and ash particles present in the flow medium can therefore easily settle at some points in the sub-chambers due to its low flow rate. A catalytic converter of that type therefore tends to become blocked.

SUMMARY OF THE INVENTION

It is accordingly an object of the invention to provide a plate-type catalytic converter, which overcomes the hereinafore-mentioned disadvantages of the heretofore-known devices of this general type and which has increased catalytic activity over a conventional plate-type catalytic converter of the same physical size, without the disadvantages of pressure loss or the risk of blockage due to deposits in sub-chambers.

With the foregoing and other objects in view there is provided, in accordance with the invention, a plate-type catalytic converter, comprising an inflow side and an outflow side for conducting a flow of a flow medium from the inflow side to the outflow side; and a stack of first plates and second plates each having a catalytically active surface and a leading edge facing toward the inflow side, the leading edges of the second plates set back toward the outflow side relative to the leading edges of the first plates.

The term "leading edges" is taken to mean the plate edges pointing toward the inflow side of the catalytic converter. The invention is based on the consideration that, when the flow medium enters the sub-chambers, turbulence occurs in the flow of the flow medium. Studies have shown that this turbulence is quickly calmed by the uniform cross section of the sub-chambers in the further progress of the flow and disappears after a short flow distance. The inlet zone or turbulence zone within the sub-chambers which is characterized by the turbulent flow is less than 20 cm. Upon progressing further, the flow medium experiences laminar flow through the sub-chambers. The main reason why the laminar flow has an unfavorable effect on the reaction conversion in the catalytic converter is because, due to the flow profile, the part of the flow medium most remote from the sub-chamber surface flows the fastest through the sub-chamber in question, i.e. has the shortest residence time within that sub-chamber. The mechanism of diffusion, which is controlled by time, inter alia, can therefore least take hold for that part of the flow medium. In contrast, the second plates within the catalytic converter, having respective leading edges which, in accordance with the invention, are set back in the direction of the outflow side as compared with those of the first plates, cause a further turbulence zone within the inlet zone, since they disturb the laminar flow which has begun to form between the first plates. This further turbulence zone forms precisely where the flow medium is flowing the fastest. It is therefore more pronounced than the first turbulence zone and in addition occurs where the catalytic reaction of the flow medium has taken place the least. This further turbulence zone is in addition set back in the direction of the outflow side as compared with the first turbulence zone, which begins directly behind the inflow side. The present invention therefore achieves more turbulence as compared with a conventional plate-type catalytic converter and extends the entire inlet characterized by turbulent flow. This increases the catalytic conversion.

In accordance with another feature of the invention, the first and second plates are stacked within a plate stack of the plate-type catalytic converter in such a way that the first and second plates alternate. This produces the greatest possible number of further turbulence zones within the inlet zone of the catalytic converter. In general, a single type of second plates which is shorter than the first plates is sufficient. It is, of course, possible for more than one type of second plates with a different degree of set-back to be provided.

In accordance with a further feature of the invention, the second plates are shortened by a distance by which their leading edges are set back. The plate edges thus form a plane on the outflow side. This means that, firstly, the catalytic converter is not lengthened unnecessarily and consequently its physical volume is not increased, and secondly, the amount of catalyst material can be reduced by the amount to which the second plates are shortened. The loss of catalytically active surface is compensated or overcompensated by the improvement in conversion as a result of the increase in turbulence.

In accordance with an added feature of the invention, in order to achieve a particularly large increase in the catalytic activity of the converter, the distance by which the leading edges of the second plates are set back is matched to the operating conditions of the converter. At normal flow rates of from 5 m/s to 10 m/s and a conventional plate separation of from 2 mm to 8 mm, this distance is advantageously selected to be between 3 cm and 10 cm.

In accordance with an additional feature of the invention, in order to produce the catalyst plates, it is cost effective to construct the plates from a supporting structure and a catalytically active coating applied thereto, preferably on both sides.

In accordance with yet another feature of the invention, the supporting structure can be, for example, a shapeable metallic wire mesh or another metallic net provided with a structure, for example beads, before application of the catalytically active coating. A material other than metal can also be used for such a supporting structure.

In accordance with yet a further feature of the invention, in order to degrade nitrogen oxides by the SCR process, the catalytically active surface of the plates which is freely accessible to the flow medium is formed of the materials titanium dioxide ($TiO_2$) in an amount of from 70 to 95% by weight, tungsten trioxide ($WO_3$) and/or molybdenum trioxide ($MoO_3$) in an amount of up to 15% by weight and vanadium pentoxide ($V_2O_5$) in an amount of less than 5% by weight. A catalyst of this type is also known as a DeNOx catalyst.

In accordance with a concomitant feature of the invention, the profiles of all of the plates are aligned virtually parallel to one another. In particular, the plates have elevations and/or beads running approximately parallel to the flow direction. In this case, only low flow resistance occurs.

Other features which are considered as characteristic for the invention are set forth in the appended claims.

Although the invention is illustrated and described herein as embodied in a plate-type catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
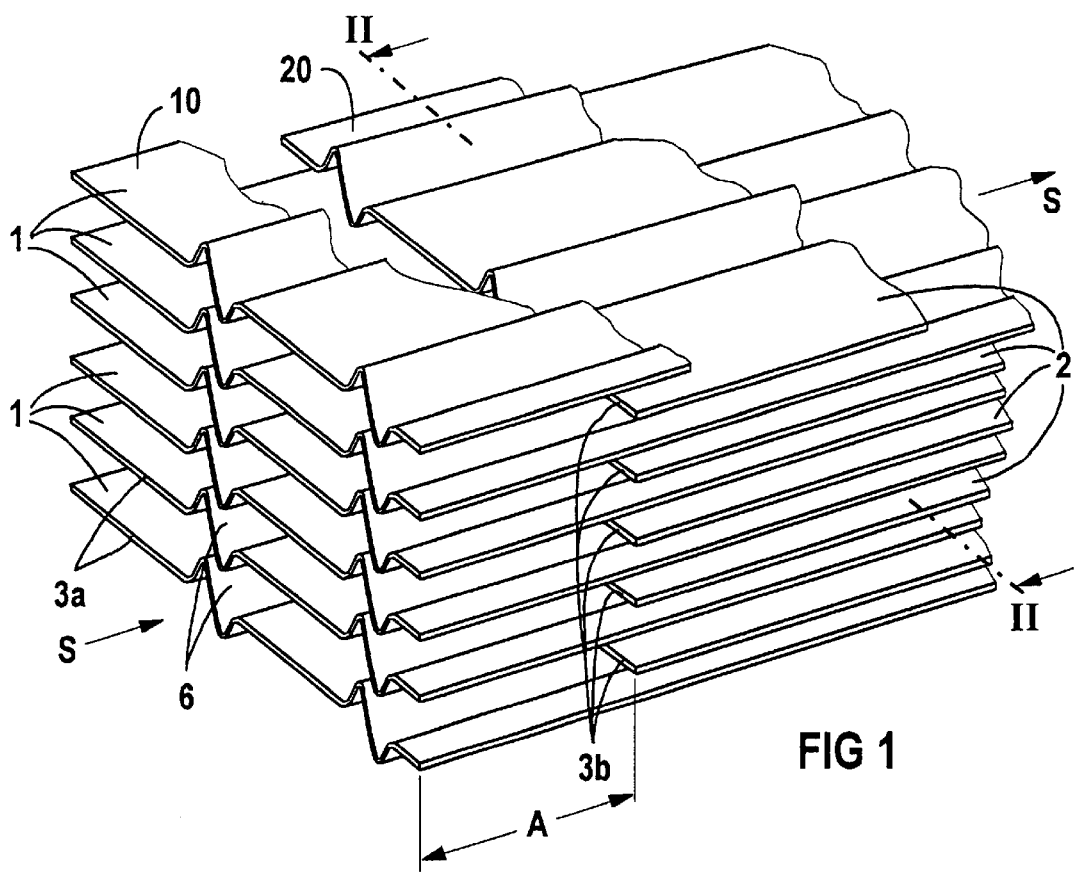
FIG. 1 is a fragmentary, diagrammatic, perspective view of plates of a plate-type catalytic converter.

Referring now to the figures of the drawings in detail and first, particularly, to FIG. 1 thereof, there are seen first plates 1 and second plates 2 which are stacked alternately in a plate stack in a plate-type catalytic converter. The plates 1, 2 are spaced from one another by beads, creases or crimps 6. This configuration of the first and second plates 1, 2 achieves the maximum number of second turbulence zones within the plate stack. Leading edges 3b of the second plates 2 are each set back in the direction of an outflow side by a distance A=6 cm in a flow direction S with respect to leading edges 3a of the first plates 1. The second plates 2 are also each 6 cm shorter than the first plates 1.

In FIG. 1, an uppermost first plate 10 is broken away in order to show an underlying plate 20, which is an uppermost second plate.

Figure 2:
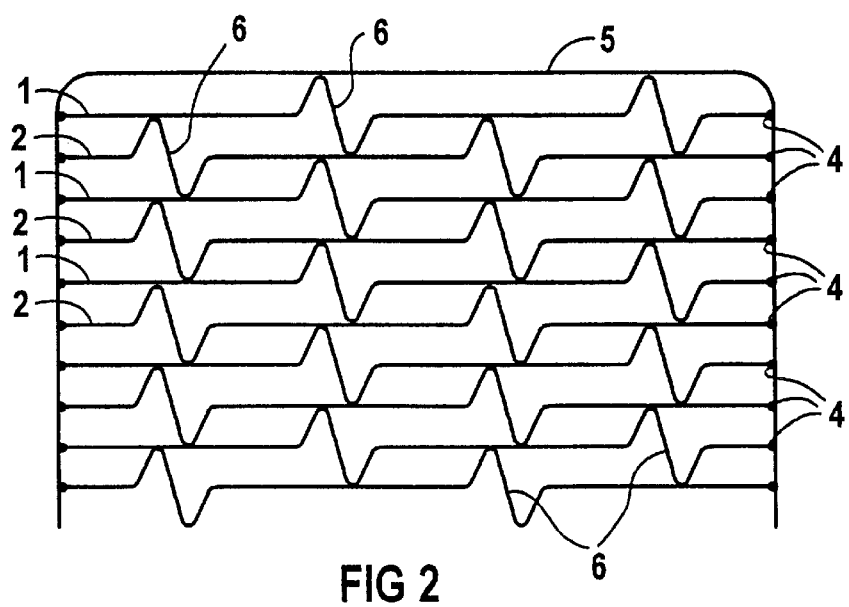
FIG. 2 is a cross-sectional view of a plate-type catalytic converter which is taken along a line II—II of FIG. 1, in the direction of the arrows.

FIG. 2 is a cross section taken along a line II—II passing through the plate stack shown in FIG. 1. The figure also shows that the plates 1, 2 are held in a frame 5 by fixings 4 in order to prevent displacement in the flow direction.

Figure 3:
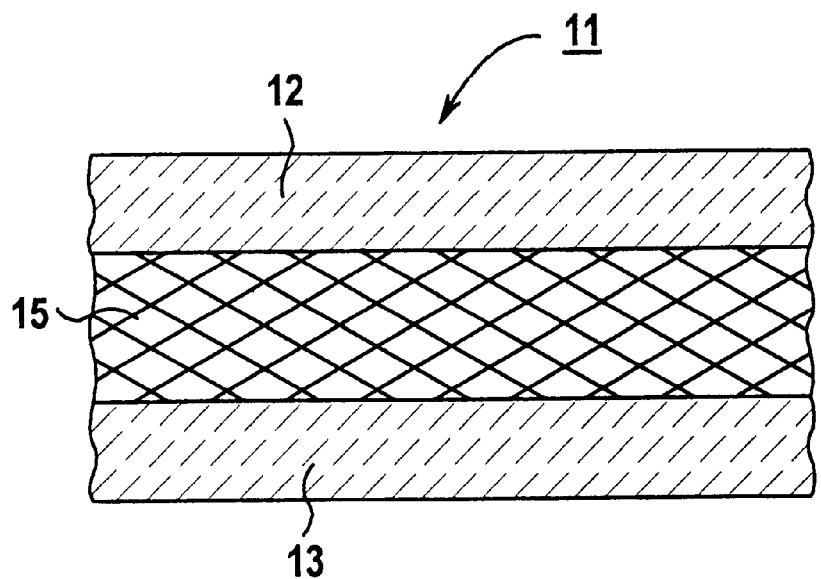
FIG. 3 an enlarged, fragmentary, cross-sectional view of a layer structure of a plate of a plate-type catalytic converter.

FIG. 3 shows a layer structure of a plate 11 of a plate-type catalytic converter. The plate 11 is made of a metallic wire mesh 15, to which a catalytically active coating 12, 13 has been applied on both sides. These catalytically active coatings 12, 13 are formed of 80% by weight of titanium dioxide ($TiO_2$), 9% by weight of each of tungsten trioxide ($WO_3$) and molybdenum trioxide ($MoO_3$), and 2% by weight of vanadium pentoxide ($V_2O_5$). A plate-type catalytic converter containing such plates is suitable for the degradation of nitrogen oxides in the flue gas or waste gas of a fossil fuel-fired power station.

We claim:

1. A plate-type catalytic converter, comprising:
   an inflow side and an outflow side for conducting a flow of a flow medium from said inflow side to said outflow side; and
   a stack of first plates and second plates each having a catalytically active surface and a leading edge facing toward said inflow side, said leading edges of said second plates set back toward said outflow side relative to said leading edges of said first plates by a distance of from 3 cm to 10 cm.

2. The plate-type catalytic converter according to claim 1, wherein said first and second plates are stacked alternately in said stack.

3. The plate-type catalytic converter according to claim 1, wherein said second plates are shorter than said first plates by a distance through which said leading edges of said second plates are set back relative to said leading edges of said first plates.

4. The plate-type catalytic converter according to claim 1, wherein said plates are each formed from a supporting structure and a catalytically active coating applied to said supporting structure.

5. The plate-type catalytic converter according to claim 4, wherein said supporting structure is metallic.

6. The plate-type catalytic converter according to claim 4, wherein said catalytically active coating is formed of titanium dioxide in an amount of from 70 to 95% by weight, tungsten trioxide in an amount of up to 15% by weight and vanadium pentoxide in an amount of less than 5% by weight.

7. The plate-type catalytic converter according to claim 4, wherein said catalytically active coating is formed of titanium dioxide in an amount of from 70 to 95% by weight, molybdenum trioxide in an amount of up to 15% by weight and vanadium pentoxide in an amount of less than 5% by weight.

8. The plate-type catalytic converter according to claim 4, wherein said catalytically active coating is formed of titanium dioxide in an amount of from 70 to 95% by weight, tungsten trioxide and molybdenum trioxide in an amount of up to 15% by weight and vanadium pentoxide in an amount of less than 5% by weight.

9. The plate-type catalytic converter according to claim 1, wherein said first and second plates have structures with at least one of elevations and beads.

10. The plate-type catalytic converter according to claim 9, wherein all of said structures of said first and second plates run parallel to one another from said inflow side to said outflow side.

* * * * *